Figure 1:
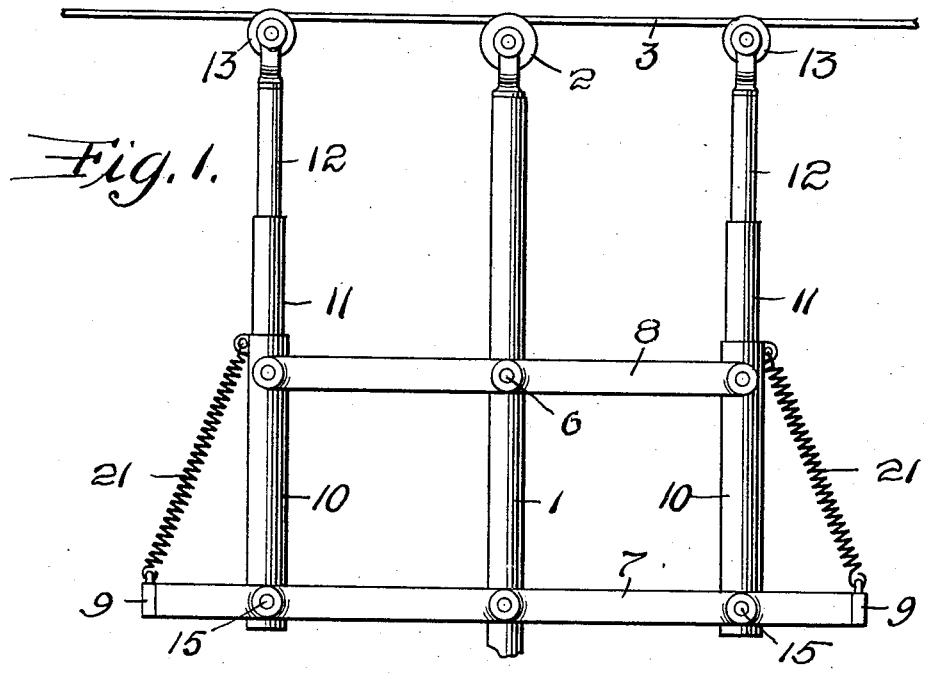

J. EBERWEIN.
TROLLEY.
APPLICATION FILED DEC. 28, 1912.

1,067,510.

Patented July 15, 1913.

WITNESSES
Samuel Payne
Clare H. Butler

INVENTOR
J. Eberwein

ATTORNEYS

COLUMBIA PLANOGRAPH CO., WASHINGTON, D. C.

UNITED STATES PATENT OFFICE.

JOHANN EBERWEIN, OF NORTH TONAWANDA, NEW YORK.

TROLLEY.

1,067,510.  Specification of Letters Patent.  Patented July 15, 1913.

Application filed December 28, 1912. Serial No. 738,992.

*To all whom it may concern:*

Be it known that I, JOHANN EBERWEIN, a subject of the King of Hungary, residing at North Tonawanda, in the county of Niagara and State of New York, have invented certain new and useful Improvements in Trolleys, of which the following is a specification, reference being had therein to the accompanying drawing.

This invention relates to trolleys, and the primary object of my invention is to furnish a trolley pole with auxiliary yieldable trolley wheels that coöperate in maintaining an electrical connection between a trolley pole and an electric conductor, as a wire or rail, thereby eliminating to a large extent, the accidental displacement of a main trolley wheel relatively to a wire, due to curves, irregularities in the wire, grades and high speed.

Another object of this invention is to provide an ordinary trolley pole with an attachment that prevents accidental displacement of the wheel of said pole, without interfering with frogs, cross-overs, and other overhead constructions of an electrical railway.

A further object of this invention is to furnish an ordinary trolley pole with auxiliary telescopic poles having wheels that are normally held in engagement with a trolley wire, thereby insuring a positive electrical connection between said wire and the main trolley pole.

A still further object of this invention is to provide a trolley pole attachment that is durable, easy to install, and highly efficient for the purposes for which it is intended.

With the above and other objects in view, the invention resides in a novel construction, combination and arrangement of parts to be hereinafter specifically described and then claimed.

Reference will now be had to the drawing, wherein:—

Figure 2:
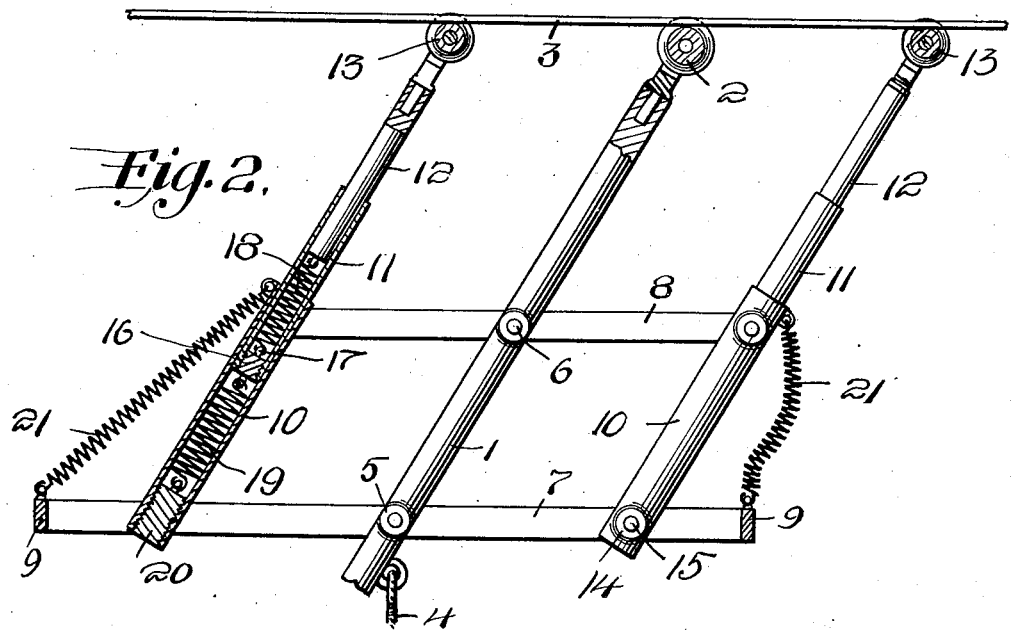

Figure 1 is a side elevation of the trolley pole attachment showing the attachment in a vertical position, and Fig. 2 is a similar view partly broken away and partly in section, showing the attachment at an inclination relatively to a trolley wire.

In the drawing, the reference numeral 1 denotes an ordinary trolley pole having the upper end thereof provided with a swiveled main trolley wheel 2 adapted to travel upon a wire 3. The pole 1 is of the ordinary type and has a cord or rope 4 to facilitate moving said pole relatively to the wire 3.

The sides of the pole 1, adjacent to the upper end thereof, are provided with bosses 5 and pivotally connected to the sides of said bosses by transverse pins 6 are a set of parallel side arms 7 and 8, the set of arms 7 being of greater length than the arms 8 and located beneath said arms. The arms 7 have the ends thereof connected by transverse bars 9, and these arms coöperate with the arms 8 in pivotally supporting auxiliary trolley poles.

Each auxiliary trolley pole comprises three telescopic sections 10, 11 and 12, the sections 10 and 11 being tubular and the section 12 solid. The section 12 supports a swiveled auxiliary trolley wheel 13 adapted to travel upon the wire 3. The section 10, at the ends thereof, has side bosses 14 and the arms 7 and 8 are pivotally held in engagement with said bosses by pins or trunnions 15. The section 11 extends into the section 10 and the inner end of said section is provided with a screw plug 16 having eyes 17. One of the eyes 17 is connected by a coiled compression spring to the end of the section 12 and the other eye is connected by a coiled compression spring 19 to a screw plug 20 mounted in the lower end of the section 10. The upper ends of the section 10 of the auxiliary trolley pole are connected by coiled springs 21 to the bars 9 of the set of side arms 7, said springs having a tendency to hold the auxiliary trolley pole vertical, as shown in Fig. 1.

Should the main trolley wheel 2 have a tendency to become displaced, the auxiliary wheel 13 maintains an electrical contact with the wire 3, and when a wire is located whereby it cannot be easily reached by the wheel 2, the auxiliary wheel 13 engages the wire until the position of the wire permits of the main wheel again engaging said wire. Such is often encountered where the trolley wire 3 is of a considerable height relatively to a car.

One embodiment of my invention has been illustrated in the drawing, and I desire it to be understood that the structural elements are susceptible to such variations and modifications as fall within the scope of the appended claim.

What I claim is:—

In a trolley, the combination with a pole adapted to be carried by a car and provided with a main trolley wheel, of a pair of parallel longitudinally extending arms pivotally connected to the sides of said pole, auxiliary telescopic poles each provided with a trolley wheel, said auxiliary poles arranged one in front and one in rear of and parallel with that pole carried by the car, said auxiliary poles extending between the ends of said parallel arms and pivotally connected thereto, a pair of longitudinally extending parallel arms of greater length than the first mentioned arms and having said poles extending therebetween, means for pivotally connecting the last mentioned arms to each of said poles, transverse bars arranged between and secured to the ends of the last mentioned arms, and inclined springs having their upper ends connected to the auxiliary poles and their lower ends to said bars.

In testimony whereof I affix my signature in the presence of two witnesses.

JOHANN EBERWEIN.

Witnesses:
ERNEST HERRMANN,
STEVE LOBS.

---

Copies of this patent may be obtained for five cents each, by addressing the "Commissioner of Patents, Washington, D. C."